G. V. PAYNE.
METHOD FOR ASCERTAINING THE LOCATION OF LEAKS IN UNDERGROUND FLUID PRESSURE PIPES.
APPLICATION FILED FEB. 23, 1917.
1,252,487.
Patented Jan. 8, 1918.
2 SHEETS—SHEET 1.
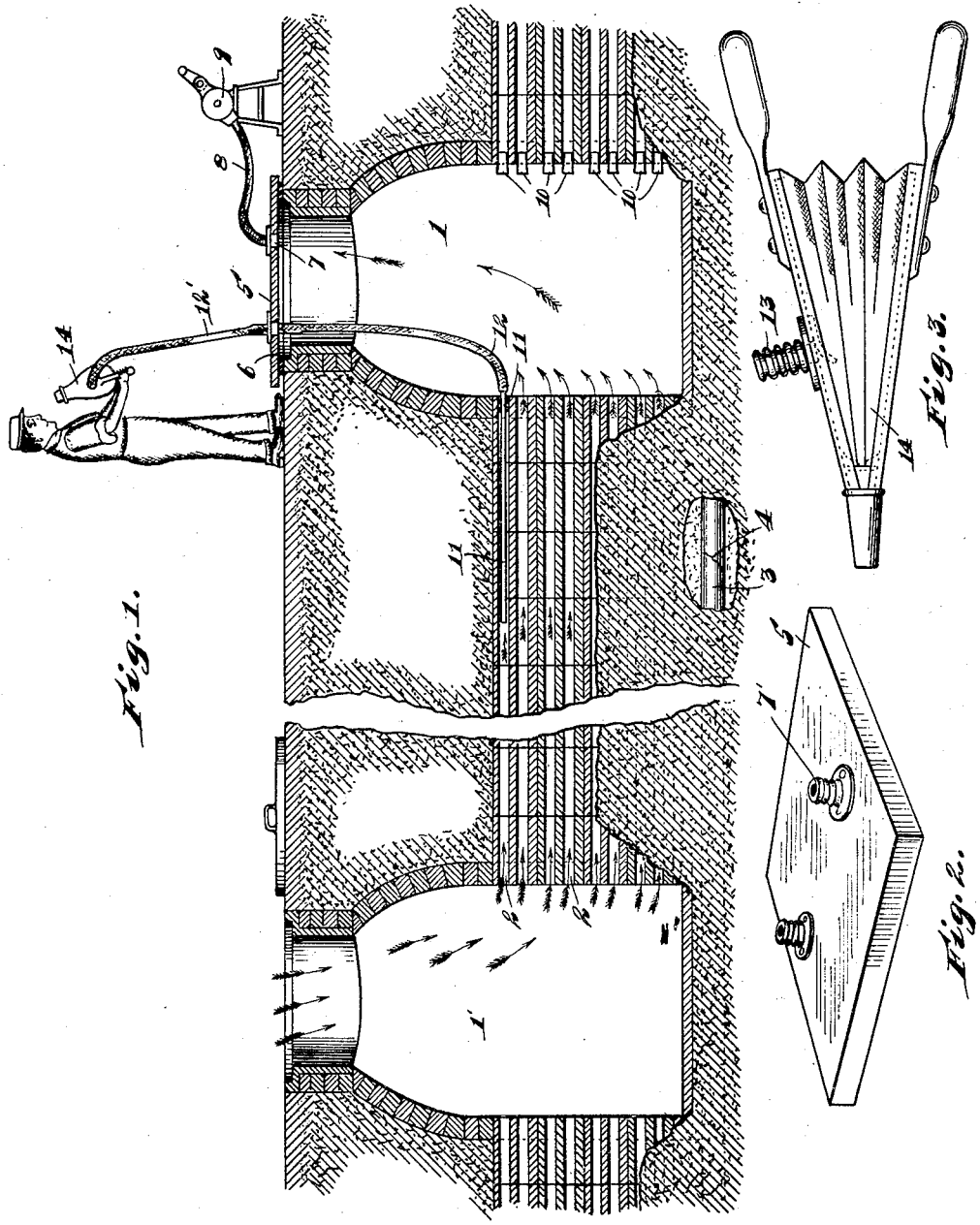
WITNESSES:
C. E. Wessels
B. G. Richards
INVENTOR.
George V. Payne,
BY
his ATTORNEY.

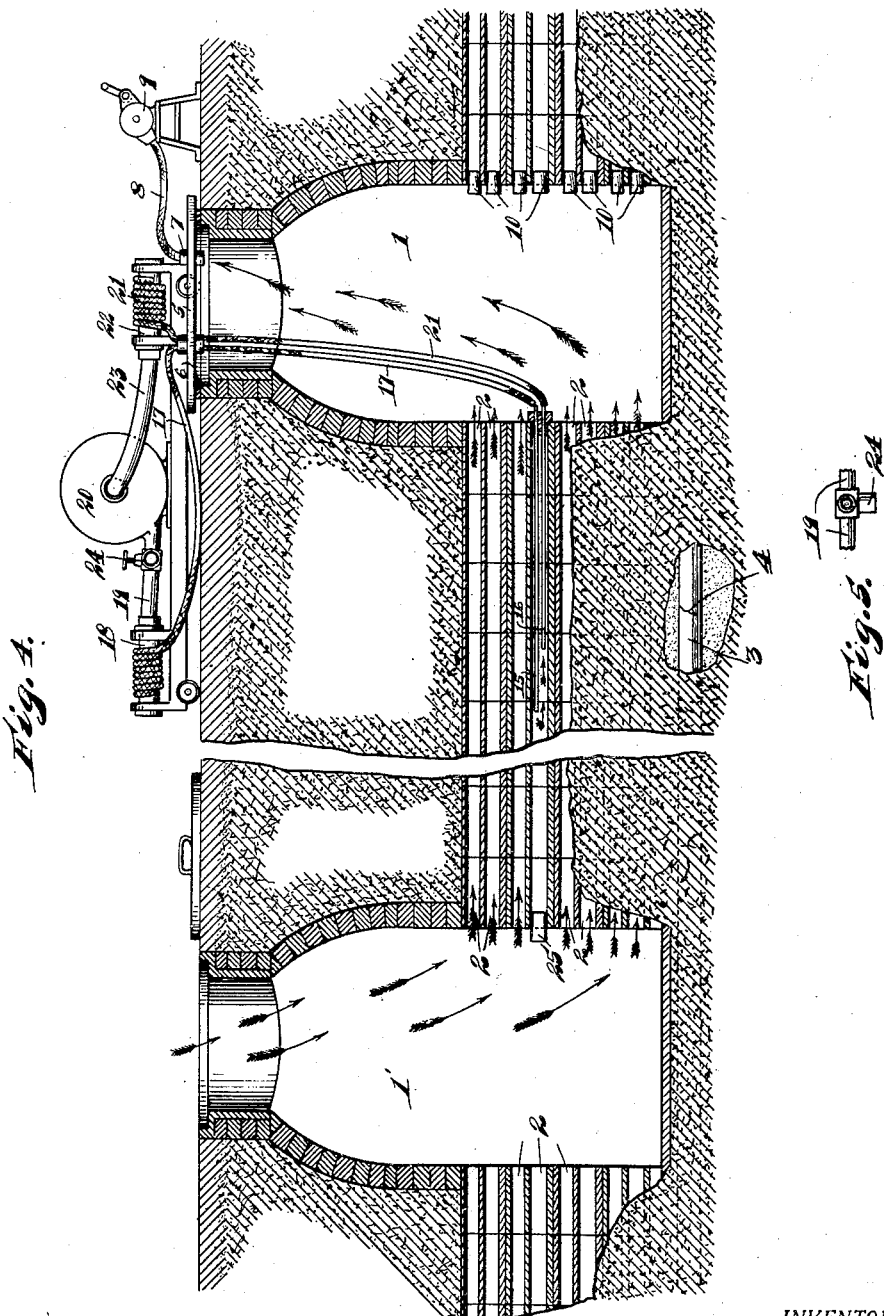

UNITED STATES PATENT OFFICE.

GEORGE V. PAYNE, OF CHICAGO, ILLINOIS.

METHOD FOR ASCERTAINING THE LOCATION OF LEAKS IN UNDERGROUND FLUID-PRESSURE PIPES.

1,252,487.  Specification of Letters Patent.  Patented Jan. 8, 1918.

Application filed February 23, 1917. Serial No. 150,544.

*To all whom it may concern:*

Be it known that I, GEORGE V. PAYNE, a citizen of the United States, and a resident of the city of Chicago, county of Cook, and State of Illinois, have invented certain new and useful Improvements in Methods for Ascertaining the Location of Leaks in Underground Fluid-Pressure Pipes, of which the following is a specification.

My invention relates to improvements in methods for ascertaining the location of a leak in a fluid pressure pipe, such as the conventional underground gas pipe, and has for its object the production of a method whereby the location of a leak in a pipe of the character mentioned may be ascertained with comparative ease and expedition, the present invention constituting an improvement or variation over that disclosed in my prior Patent No. 1,041,156, granted October 15th, 1912.

Other objects will appear hereinafter.

With these objects in view, my invention consists in the combinations and arrangements of parts employed in the manner or method hereinafter described and claimed.

My invention will be more readily understood by reference to the accompanying drawings forming a part of this specification, and in which, Figure 1 is a fragmentary sectional view through a section of ground, exposing the underground vaults, conduits and fluid pressure pipe and illustrating the employment of a method embodying my invention, Fig. 2, is a perspective view of a transparent closure plate employed in the practice of the invention, Fig. 3, a side elevation of a bellows which is used in the practice of the invention, Fig. 4, a view similar to Fig. 1 but showing a modified form of construction, and Fig. 5, a detail view of means for permitting tests employed in the construction shown in Fig. 4.

Referring to the drawing, I have illustrated two vaults or manholes 1 and 1' which are embedded or sunk in the ground and constructed in the usual manner. Extending between the vaults 1 and 1' are conduits 2 which ordinarily serve to accommodate the electric, telegraph or other wires which are buried below the surface of the ground, said conduits being formed, as is usual of a plurality of alining sections, the joints between adjacent sections of said conduits being left not tightly closed so that gases or fluids in the ground in the vicinity may enter through said joints into the interiors of said conduits. Arranged adjacent the conduits 2 is a fluid pressure pipe 3, such as an ordinary gas pipe through which is conveyed the illuminating gas. In the pipe 3 is shown the rupture or leak 4 which it is desired to locate in order that the leak or rupture may be stopped or repaired. The construction set forth is old and well known, the same being used at the present time in most cities or towns of considerable size.

In the practice of my invention, it is first determined between which two vaults the leak in the fluid pressure pipe has occurred, this being readily ascertained through the sense of smell, since upon a leak occurring in the fluid pipe, the fluid will permeate the soil in the vicinity and find its way to the conduits whence it will pass to and be discharged into the adjacent vaults. This being so, by removing the closures of said vaults, the presence of a strong odor will indicate that a leak has occurred adjacent thereto. After determining that the leak in the pipe 3 is located somewhere between the vaults 1 and 1', the covers of the latter are removed, and the upper end of the vault 1 closed by a transparent closure 5, preferably of glass, the transparent closure 5 being used so as to permit of the passage of light in order to illuminate the vault for operation therein. A felt packing or gasket 6 is preferably interposed between the upper edge of the vault and the under side of the closure 5 to insure a reasonably tight connection. The closure 5 is formed with an opening 7 over which is arranged a nipple 7' for connection with a flexible hose 8 which extends to a suitable manually operable blower 9, the arrangement being such that, when the blower 9 is operated, air will be withdrawn from the vault 1 to create a draft through the conduits 2 in the direction shown by the arrows. The upper end of vault 1' is left open in order to permit of ready entry of air drawn through the conduits 2 and the terminals of other conduits entering the vault 1 are preferably stopped by plugs or other suitable stopping devices 10 so as to positively insure the creation of a draft in the conduits 2. In the event of a wind blowing in the proper direction, the blower 9 may be dispensed with and the upper end of the vault 1 left open, since a wind blowing in the proper direction will create a draft through the conduits 2 practically as effectual as that created by said blowing device.

The creation of a draft in the direction shown and mentioned through the conduits 2, draws the gas escaping from the leak 4 and entering said conduits toward the vault 1, so that the portions of said conduits between the point of entry of said gases thereinto and the vault 1', will contain only fresh or sweet air which has been drawn thereinto by the blower 9 or by reason of the draft created in said conduits.

A sectional pipe of comparatively small diameter is next inserted into one of the conduits 2, the section 11 of said pipe being successively connected so that the front end of said pipe will extend progressively into the conduit toward the point of entry of gases into the same. At intervals, the contents of the conduit at the front end of said pipe will be withdrawn for examination by the operator positioned outside and above the vault 1. This withdrawal is effected by the connection of a flexible tube 12 with the rear end of said pipe, said tube being in turn connected through plate 5 with another tube 12' connected with a nipple 13 arranged over the intake port of an ordinary bellows or pneumatic 14. With this arrangement, upon the expansion of said bellows, a suction will be created in the pipe 11 so as to withdraw a portion of the contents of the conduit in which the same is inserted, the contents thus withdrawn entering said bellows and being discharged therefrom when the latter is collapsed. In discharging the contents of said bellows, it may be readily determined by the sense of smell whether or not the same contains gases escaping from the leak 4. The contents of the conduit 2 withdrawn through the pipe formed by the sections 11, will continue to be fresh and uncontaminated until the front end of said pipe reaches the point of inlet of the escaping gases to said conduit, when upon the withdrawal of said gases through said pipe for examination, as above mentioned, the presence of a strong odor will serve to inform the operator that the front end of the pipe is positioned at the point of inlet of the escaping gases into the conduit. The length of the pipe inserted into the conduit is then computed, serving to definitely locate the position of the point of entry of gases thereinto. The point of leakage in the pipe 3 will necessarily be in close proximity to the point of entry into the conduit of the gases escaping from said pipe, and so that the location of the point of leakage in said pipe will thus also be determined. Having thus located the point of leakage in the fluid of gas pipe, the ground immediately above the same may be excavated so as to gain access thereto to repair or stop the leak.

Obviously the test may be made from either end of the conduits, as desired, and the operator actually making the smelling test, being in the open atmosphere, can more readily detect the presence of gases or other odors and at the same time be free of danger of asphyxiation from the gases.

In the modified form of construction shown in Figs. 4 and 5, two testing pipes 15 and 16 are employed, the pipe 15 being somewhat longer than the pipe 16. Pipe 15 is connected by means of a hose or tube 17 with a hollow shaft 18 of a hose reel arranged outside of the vault 1. The shaft 18 is connected by means of a pipe 19 with the discharge end of an ordinary centrifugal blower 20. Pipe 16 is connected by means of a hose 21 with the hollow shaft 22 of another hose reel connected by a pipe 23 with the intake of the blower 20. A discharge branch 24 governed by a three-way valve is provided for pipe 19.

In using this modification the pump or fan 9 is first operated to clear the vaults and conduits as far as possible from gas which has previously leaked thereinto. Then one end of the conduits 2 which it is desired to test is closed with a plug 25 and the operation of the fan 9 discontinued. Then the plugged conduit 2 is tested by means of the pipes 15 and 16. In doing so fan 20 is operated to force a draft of air from said fan outwardly through pipe 15 and back through pipe 16, as indicated by the arrows in Fig. 4. The pipes thus operated are adjusted to different longitudinal positions in the plug to conduits 2 and the draft from said pipes tested for each position. This test is readily made by throwing the valve to cause discharge of the air through the branch 24 which may be tested by the sense of smell or otherwise. The pipes 15 and 16 are thus adjusted along through the conduits 2 until the odor of gas is noticed which will indicate the point at which the leak takes place.

While I have illustrated and described the preferred method and forms of construction for carrying my invention into effect, these are capable of variation and modification without departing from the spirit of the invention. I, therefore, do not wish to be limited to the exact details of the method and construction set forth, but desire to avail myself of such variations and modifications as come within the scope of the appended claims.

Having described my invention what I claim as new and desire to secure by Letters Patent is:

1. The method of ascertaining the location of a leak in an underground fluid pressure pipe which consists primarily in creating a draft in one direction adjacent the leak, and secondarily in creating a suction in said draft in the same direction, substantially as described.

2. The method of ascertaining the location of a leak in an underground fluid pressure pipe which consists primarily in creating a draft in one direction adjacent the leak, and secondarily in creating a suction in said draft in the same direction by means of a pipe arranged in said draft, substantially as described.

3. The method of ascertaining the location of a leak in an underground fluid pressure pipe which consists primarily in creating a draft in one direction adjacent the leak, and secondarily in creating a suction in said draft in the same direction by means of a pipe arranged and progressively extended in said draft, substantially as described.

4. The method of ascertaining the location of the point of entry of fluid into a conduit which consists in first creating a draft in said conduit, second in inserting a pipe into said conduit, and then creating a suction in said pipe in the same direction as that of said draft, substantially as described.

5. The method of ascertaining the location of the point of entry of fluid into a conduit which consists in first creating a draft in said conduit, second in inserting a sectional pipe progressively into said conduit, and then creating a suction in said pipe in the same direction as that of said draft, substantially as described.

6. The method of ascertaining the location of the point of entry of fluid into a conduit open at both ends which consists in first creating a draft in said conduit by exhausting air from one end thereof, second in inserting a pipe of a diameter less than that of said conduit into said end of the latter, and then intermittently creating a suction in said pipe in a direction the same as that of said draft, substantially as described.

7. The method of ascertaining the location of the point of entry of fluid into a conduit extending between and opening into two vaults which consists in first exhausting air from one of said vaults to create a draft in one direction in said conduit, second in inserting and progressively extending a pipe into said conduit from a position in said last mentioned vault, and third in intermittently creating a suction in said pipe in a direction the same as that of said draft, substantially as described.

8. The method of ascertaining the location of the point of entry of fluid into a conduit extending between and opening into two upwardly opening vaults, which consists in first closing the upper end of one of said vaults with a transparent closure, second in exhausting air from said closed vault to create a draft in one direction through said conduit, third in inserting and progressively extending a pipe into said conduit from a position within said last mentioned vault, and fourth in intermittently drawing some of the contents of said conduit at the front end of said pipe through the latter for examining the same, substantially as described.

9. The method of ascertaining the location of the point of entry of fluid into a conduit extending between and opening into two upwardly opening vaults, which consists in first closing the upper end of one of said vaults with a transparent closure, second in withdrawing air from said vault to create a draft in one direction through said conduit, third in inserting and progressively extending a pipe into said conduit from a position within said last mentioned vault, and fourth in connecting a bellows located above and outside of said closed vault, with the rearward end of said pipe for intermittently drawing some of the contents of said conduit at the front end of said pipe through the latter for examining the same, substantially as described.

10. The method of ascertaining the location of the point of entry of fluid into a conduit opening into a vault, which consists in exhausting air from said vault and withdrawing air from different points of said conduit, and testing said withdrawn air for the presence of said fluid, substantially as described.

11. The method of ascertaining the location of the point of entry of fluid into a conduit opening into a vault, which consists in the closing of said vault and exhausting air therefrom and in withdrawing air from different points in said conduit to a point outside of said vault, and then testing withdrawn air for the presence of said fluid, substantially as described.

12. The method of ascertaining the location of the point of entry of fluid into a conduit extending between and opening into two upwardly opening vaults, which consists in first closing the upper end of one of said vaults with a transparent closure, second in withdrawing air from said vault to create a draft in one direction through said conduit, third in inserting and progressively extending a pipe into said conduit from a position within said last mentioned vault, fourth in connecting a bellows located outside of said last mentioned vault with the rearward end of said pipe, and then intermittently withdrawing air from said pipe by means of said bellows for examining the same, substantially as described.

In testimony whereof I have signed my name to this specification in the presence of two subscribing witnesses.

GEORGE V. PAYNE.

Witnesses:
JOSHUA R. H. POTTS,
HELEN F. LILLIS.